United States Patent [19]

Aranguren

[11] 4,164,787
[45] Aug. 14, 1979

[54] MULTIPLE MICROPROCESSOR INTERCOMMUNICATION ARRANGEMENT

[75] Inventor: William L. Aranguren, Sayreville, N.J.

[73] Assignee: Bell Telephone Laboratories, Incorporated, Murray Hill, N.J.

[21] Appl. No.: 849,894

[22] Filed: Nov. 9, 1977

[51] Int. Cl.² ............................................. G06F 13/06
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,551,892 | 12/1970 | Driscoll, Jr. | 364/200 |
| 3,715,729 | 2/1973 | Mercy | 364/200 |
| 3,774,157 | 11/1973 | Tsui | 364/200 |
| 3,886,525 | 5/1975 | Brown et al. | 364/200 |
| 3,896,418 | 7/1975 | Brown | 364/200 |
| 3,934,232 | 1/1976 | Curley et al. | 364/200 |
| 3,940,743 | 2/1976 | Fitzgerald | 364/200 |
| 4,034,347 | 7/1977 | Probert, Jr. | 364/200 |
| 4,048,623 | 9/1977 | Gruner | 364/200 |
| 4,050,059 | 9/1977 | Williams et al. | 364/200 |
| 4,065,809 | 12/1977 | Matsumoto | 364/200 |

OTHER PUBLICATIONS

R. H. Naugle, "Dual Processors See-Saw to Double Throughput," in *EDN*, vol. 22, No. 20, Nov. 5, 1977, pp. 27–28.

*Primary Examiner*—Gareth D. Shaw
*Assistant Examiner*—Thomas M. Heckler
*Attorney, Agent, or Firm*—Erwin W. Pfeifle

[57] ABSTRACT

The present invention relates to method and apparatus for providing a communication arrangement between two or more independently operable microprocessor units (MPUs). Large amounts of data or data in block format are capable of being passed between MPUs via the present intercommunication channel with little handshaking between MPUs. In the present arrangement, a plurality of MPUs sequentially access, under the control of a synchronous clock, a common memory for random access to blocks of memory for writing data therein or for reading data previously written therein without the necessity for contention resolving means.

9 Claims, 6 Drawing Figures

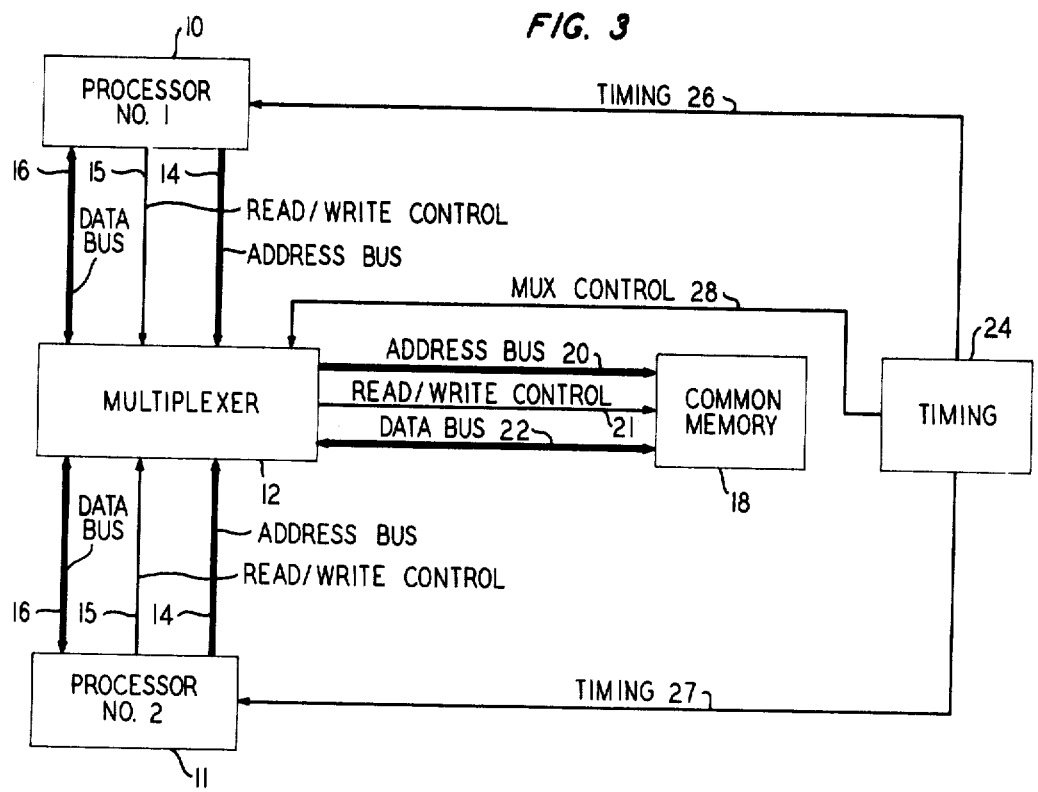

MULTIPLE MICROPROCESSOR INTERCOMMUNICATION ARRANGEMENT

BACKGROUND OF THE INVENTION

1. Field of the Invention

The present invention relates to a multiple microprocessor intercommunication arrangement and, more particularly, to a multiple microprocessor intercommunication arrangement which permits two or more independently operating microprocessor units (MPUs) to sequentially access, under the control of synchronous clock signals, a common memory for either writing data therein or for reading data previously written therein without the need for continuous resolving means.

2. Description of the Prior Art

Systems incorporating multiple microprocessor units (MPUs) for processing system information almost invariably require an intercommunication channel between the various MPUs. Under conditions where two MPUs operate independently and require very little communication therebetween, a simple link comprising, for example, a peripheral interface adapter can be used to provide a single word path in each direction. Communication over such a link, however, would require control circuitry to permit each of the interconnected MPUs to be appropriately prepared to concurrently transmit and receive each byte to be passed therebetween, which is commonly termed "handshaking between MPUs". A simple link of this type creates no problem if processing time is plentiful or if the volume of traffic is very small.

Where other than a simple link is required, various arrangements have been devised to provide the necessary timing and control for multiple MPUs to gain access to the associated memory. For example, U.S. Pat. No. 3,715,729 issued to B. R. Mercy on Feb. 6, 1973 discloses a multiprocessor system having plural autonomous digital data processors operable to communicate individually with a common storage system. Each processor has its own clock, and a timing control means selectively uses any one of the individual processor clocks for timing the communication of its or any other processor with the common storage system. In another arrangement, U.S. Pat. No. 3,940,743 issued to B. P. Fitzgerald on Feb. 24, 1976 discloses a unit for interconnecting otherwise independently operable data processing systems. When one data processing system addresses the interconnecting unit, the unit acts like a peripheral device by converting the address to a physical memory address for the other data processing system. Furthermore the unit interrupts the other system to effect a data transfer either to or from the other system. Another arrangement is disclosed in U.S. Pat. No. 3,988,716 issued to J. C. Fletcher, et al. on Oct. 26, 1976 which relates to an interface logic circuit permitting the transfer of information between two computers having asynchronous clocks. The information transfer involves utilization of control signals to generate properly timed data strobe signals. Noise problems are avoided because each control signal, upon receipt, is verified by at least two clock pulses at the receiving computer. If control signals are verified, a data strobe pulse is generated to accomplish a data transfer. Once initiated the data strobe signal is properly completed independently of signal disturbances in the control signal initiating the data strobe signal. Completion of the data strobe signal is announced by automatic turn-off of a return-response control signal.

The foregoing prior art references are seen to function during the accessing of an MPU with the memory. Arrangements are also known which primarily function after the time that an MPU accesses the memory. In this regard see, for example, U.S. Pat. No. 3,886,525 issued to P. J. Brown, et al. on May 27, 1975 which discloses a data processing technique which permits a plurality of users of a data processing system to share data in a data store, thereby providing independent and asynchronous access to the data for subsequent processing by either user. The sharing of small data items is accomplished without requiring the use of interlocks to prevent one user from obtaining access to the shared data item while the other is processing the data for subsequent replacement in the shared data store.

The problem remaining in the prior art is to permit two or more MPUs to separately gain access to a memory in a communication channel therebetween without the need for contention resolving techniques.

SUMMARY OF THE INVENTION

The problem is solved in accordance with the present invention using a multiple microprocessor intercommunication arrangement which permits two or more independently operating microprocessor units (MPUs) to sequentially access, under the control of a synchronous clock, a common memory for writing data therein or for reading data previously written therein.

It is an aspect of the present invention to provide a multiple microprocessor interconnection arrangement comprising at least two MPUs which concurrent perform different functions, an intercommunication channel comprising a memory which is connected to each of the MPUs, and a timing means capable of sequentially permitting each of the MPUs to gain access to any memory location in the interconnected memory to enable data to be transferred therebetween without the use of contention resolving techniques.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 3 illustrates a diagram in block form of a dual processor system with total shared memory using the concepts of the present invention;

FIG. 4 illustrates a timing diagram for a read cycle in accordance with the present invention for the dual processor system shown in FIG. 3;

DETAILED DESCRIPTION

The present invention is described hereinafter in association with the use of the Motorola M6800 microprocessor units (MPUs) to simplify and more clearly convey the concept of the present invention since such MPU only employs a two-phase operating cycle. It is to be understood that such description is exemplary only and is for purposes of exposition and not for purposes of limitation. It will be readily appreciated that the inventive concept described is equally applicable with the use of other makes and models of MPUs having similar or other operating cycles. For example, where another MPU has an operating cycle which employs more than two phases, the multiplexing arrangement of the address and data signal between the common memory and the various MPUs will have to be modified in accordance with means easily accomplished and known to those skilled in the art. Such modification means, for instance, can take the form of adding appropriate chips in the multiplexer.

Figure 1:
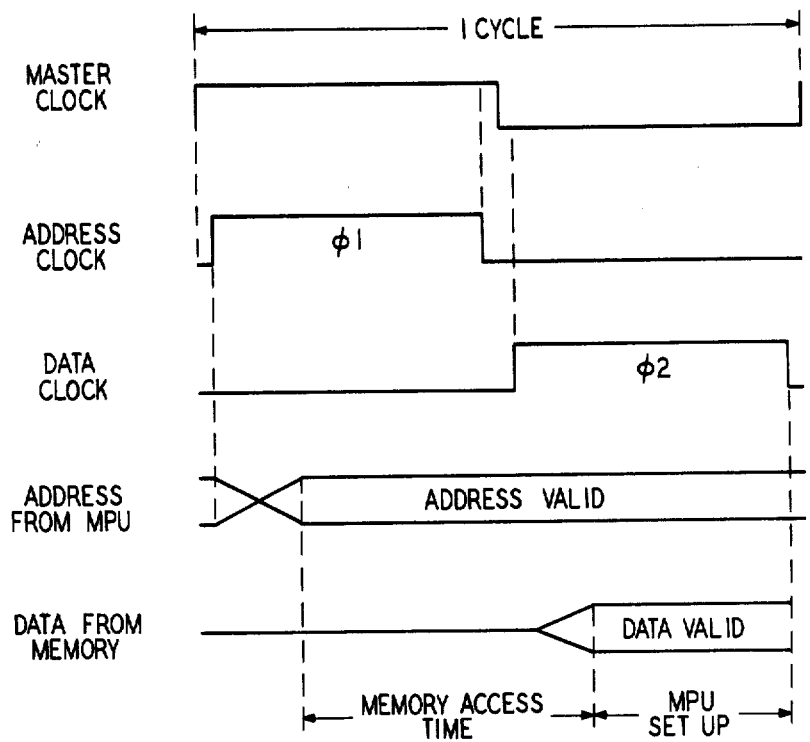
FIG. 1 illustrates an exemplary timing diagram for a microprocessor read cycle used in the prior art.
Figure 2:
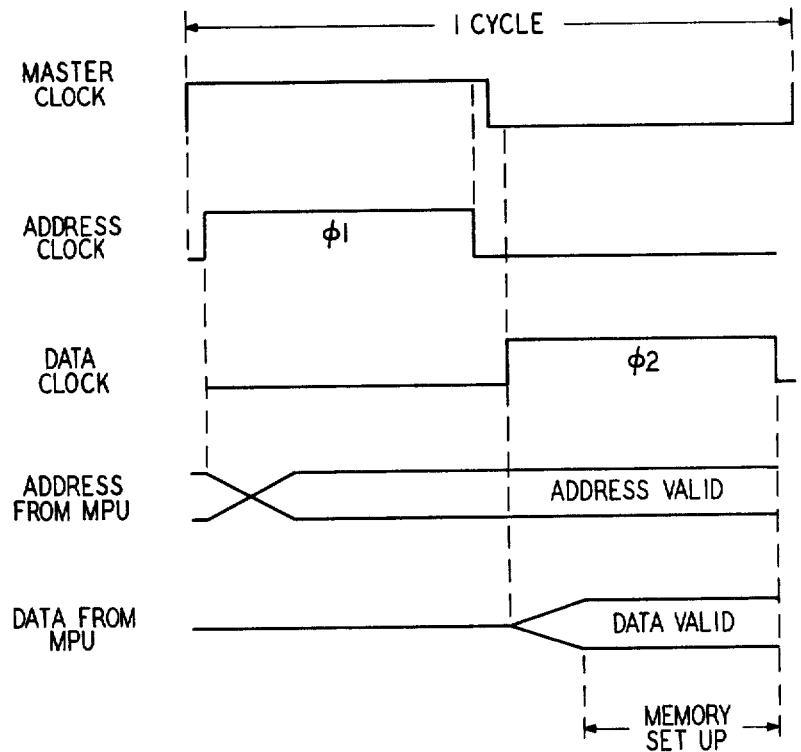
FIG. 2 illustrates an exemplary timing diagram for a microprocessor write cycle used in the prior art.

As was stated hereinbefore, the present invention is being described using Motorola M6800 MPUs. To more clearly understand the concepts of the present invention, FIGS. 1 and 2 illustrate the typical timing diagrams for the read cycle and the write cycle, respectively, of a two-phase operating cycle as used with the Motorola M6800 unit. In the timing diagram of the read cycle shown in FIG. 1, the address clock signals and the data clock signals are derived from a master clock signal to produce a two-phase operating cycle designated $\Phi1$ and $\Phi2$. From FIG. 1 it is seen that the address and data clock signals comprise non-overlapping pulses where the termination of one pulse occurs before the rising edge of the other pulse. Such timing pulses can easily be derived from a master clock signal using appropriate inverting and delay means as are well known and commercially available to those skilled in the art.

As shown in FIG. 1, the rise of the $\Phi1$ pulse associated with the address clock enables the MPU to cause it to output the address of the memory cell or peripheral circuit to be read on the bus interconnecting the microprocessor units and the externally associated circuits. The address to be read is continually outputted until the rise of the next subsequent $\Phi1$ pulse at which time the next address in the program sequence will be outputted by the MPU. Each time an address is sent to the memory or peripheral circuit, the addressed unit will transmit the data back to the MPU after a predetermined access time, which is dependent on the speed of the memory used in the addressed unit, until the MPU transmits another address. The master clock cycle, however, must be long enough such that the memory access time plus the MPU set up time is of sufficient length to permit the MPU to latch the data at the end or the fall of the $\Phi2$ pulse. More particularly, to permit the MPU to latch the data at the end of the $\Phi2$ pulse, the data must be available to the MPU a predetermined period of time before latching is to occur, which predetermined time period is dependent on the make and model of MPU used. For example, for the Motorola M6800, the predetermined time period is approximately 100 nanoseconds.

FIG. 2 illustrates the timing of a write cycle which has the same basic procedure as for the read cycle of FIG. 1 except that during the $\Phi2$ pulse the MPU is instructed to output the data to be stored in memory at the address location identified by the address which was transmitted beginning at the fall of the $\Phi2$ pulse. The data must be available to the memory for a sufficient period of time before the fall of the $\Phi2$ pulse to permit this data to be latched into memory.

In both the read and the write cycles shown in FIGS. 1 and 2, respectively, the memory or peripheral circuit begins decoding the address transmitted by the MPU as soon as it becomes available during the $\Phi1$ pulse. The rise of the $\Phi2$ pulse, in the write cycle of FIG. 2, instructs the MPU to output the data which is then latched into the memory at the end of the $\Phi2$ pulse. Similar to FIG. 1, the length of the master clock cycle should be long enough to accommodate the memory write cycle time by the end of the $\Phi2$ pulse when the data is latched into memory. In accordance with the present invention, two or more MPUs can sequentially access the memory by employing a memory which is sufficiently fast such that during the time period of a $\Phi2$ pulse the memory is capable of both decoding the address received from the MPU and either (1) outputting the data in sufficient time for the MPU to latch the data during a read cycle or (2) latching the data received from the MPU during a write cycle. In this manner two MPUs can sequentially access the memory by using complementary master clock signals such that one MPU communicates with the memory during the period of the $\Phi1$ pulse shown in FIGS. 1 and 2 and the other MPU communicates with the memory during the period of the $\Phi2$ pulse shown in FIGS. 1 and 2.

FIG. 3 illustrates such an arrangement in accordance with the present invention whereby the entire memory may be shared by two MPUs operating from complementary master clocks. As shown in FIG. 3, a first and a second MPU, designated 10 and 11, respectively, are each connected to a multiplexer 12 via a separate address bus 14, a separate read/write control lead 15, and a separate data bus 16. Multiplexer 12 is in turn connected to a common memory 18 via an address bus 20, a read/write control lead 21, and a data bus 22. A timing means 24 which produces the master clock pulses and the separate clock pulses for each of MPUs 10 and 11 and multiplexer 12 is connected to MPU 10 via lead 26, to MPU 11 via lead 27 and to multiplexer 12 via lead 28. In accordance with the arrangement of FIG. 3, the address bus 20 and read/write control lead 21 to memory 18 is time shared by MPUs 10 and 11 via multiplexer 12. The data bus 22 to memory 18 is also time shared with MPUs 10 and 11 but requires a bidirectional multiplexing arrangement between the MPUs 10 and 11 and the memory 18 because of the read/write capability.

FIG. 4 illustrates the timing diagram of a read cycle for a first and a second Motorola M6800 or similar MPU 10 and 11 interconnected to a common memory 18 via a multiplexer 12 in accordance with the present invention where the MPUs alternately read from memory 18 in response to synchronous clock signals from timing means 24. Timing means 24 generates from the master clock signals each of the $\Phi1$ and $\Phi2$ pulses which are sent to MPU 10 and MPU 11 on leads 26 and 27, respectively. As shown in FIG. 4, the $\Phi1$ and $\Phi2$ pulses associated with each of the MPU 10 and MPU 11 correspond to the $\Phi1$ and $\Phi2$ pulses shown in FIG. 1 except that the pulses for MPU 11 are derived from a master clock signal which is complementary to the master clock signal used to derive the timing signals for MPU 10. The timing for the read cycle for each of MPUs 10 and 11 is shown in FIG. 1 and depicts the expected availability of signals on address bus 14 and data bus 16 when referred to the associated Φ1 and Φ2 pulses in FIG. 4. As was stated previously, by using a memory which is sufficiently fast to permit the memory to decode the address and output the data in sufficient time for the associated MPU to latch the outputted data during the period of the Φ2 pulse, it is possible to permit two MPUs to alternately read from the memory using synchronous clock pulses.

The operation of the arrangement of FIG. 3 for a read cycle for both MPUs can best be understood when referring to the read timing cycles shown in FIGS. 1 and 4. Once the system has been initialized, the individual operation of each of MPUs 10 and 11 is shown in the timing diagram of FIG. 1. More particularly, the rise of the Φ1 pulse on leads 26 and 27 to MPU 10 and 11, respectively, as shown in FIG. 4 causes the associated MPU to output the address to be read on the associated address bus 14 for the remaining duration of the associated Φ1 and Φ2 pulses as shown in FIG. 1. During the period of the associated Φ1 and Φ2 pulse, each MPU also transmits the appropriate read/write control signal on the the associated lead 15 which for the present example is a read control signal.

Concurrent with the rise of the Φ2 pulse associated with each MPU, a signal is sent by timing means 24 via lead 28 to multiplexer 12 to cause multiplexer 12 to connect address bus 20, read/write control lead 21 and data bus 22 to the address bus 14, read/write lead 15 and data bus 16, respectively, of the MPU 10 or 11 associated with that Φ2 pulse. Once the busses are interconnected the address on bus 14 and the read signal on read/write lead 15 are made available to memory 18. The memory, in turn, decodes the address and outputs the data stored thereat on data bus 22, which data signals propagate via multiplexer 12 and data bus 16 to the destined MPU, in sufficient time to be latched by that MPU at the end of the associated Φ2 pulse. The occurrence of the Φ2 pulse associated with the other MPU repeats this procedure for that MPU. In this manner two MPUs can sequentially access a common memory 18 without the need for contention resolving means.

The arrangement of FIG. 3, however, has primarily two disadvantages. The common memory 18 is generally used to store the individual program and scratchpad memory for each MPU in addition to the messages generated by one MPU for the other MPU. If one MPU goes wild due to possibly a noise burst or software or hardware bug, such MPU is capable of wiping out valuable information stored or primarily used by the other processor. Secondly, faster memory is typically more expensive and more power consuming than a slow memory and thus should be limited to areas of real need.

Figure 5:
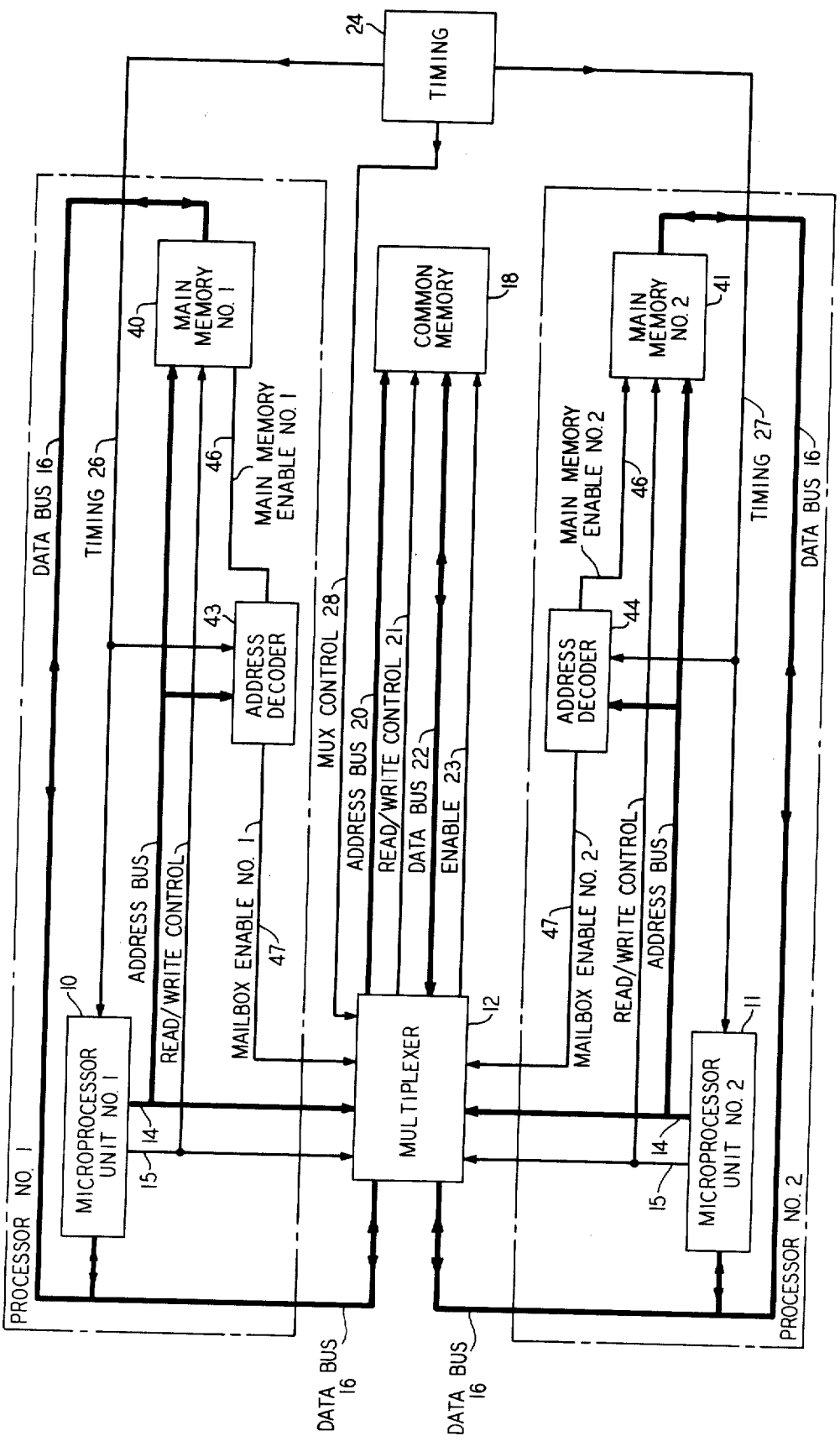
FIG. 5 illustrates an exemplary dual processor system including a mailbox memory in accordance with the concepts of the present invention.

FIG. 5 shows a block diagram of a two MPU system having a "mailbox" type intercommunication channel which substantially reduces the aforementioned disadvantages. There, as in the arrangement of FIG.3, MPUs 10 and 11 are connected to a multiplexer 12 via an address bus 14, read/write control lead 15 and data bus 16 and multiplexer 12 is connected to a memory 18 via an address bus 20, read/write control lead 21 and data bus 22 in addition to an enable lead 23. In the arrangement of FIG. 5, however, MPUs 10 and 11 each have a separate memory 40 and 41, respectively, which are connected to the related address bus 14, read/write lead 15 and data bus 16. Main memories 40 and 41 each contain the program and possibly a scratchpad memory for the associated MPU.

MPUs 10 and 11 each have a separate address decoder 43 and 44, respectively, associated therewith which receives the address outputted by the associated MPU on address bus 14 concurrent with the receipt thereof by multiplexer 12 and the respective main memory 40 or 41. Address decoders 43 and 44 receive the Φ1 and Φ2 timing signals on leads 26 and 27, respectively, from timing means 24 concurrent with the receipt of such timing signals by the respective MPUs 10 and 11. Address decoders 43 and 44 are connected at the output side thereof to both the main memory 40 and 41, respectively, via a lead 46 and to multiplexer 12 via a lead 47.

In the operation of the arrangement of FIG. 5, each MPU 10 and 11 outputs the address on the associated address bus 14 in response to the rise of the associated Φ1 pulse on leads 26 and 27, respectively, as shown in FIGS. 1 and 2 for the individual MPU read and write cycles. The address decoders 43 and 44 similary receive the rise of the Φ1 pulse destined for MPU 10 and 11, respectively, and in response thereto decode the address transmitted by the related MPU 10 and 11 on bus 14 to the decoder, multiplexer and the associated main memory to determine whether such address lies in main memory 40 and 41, respectively, or in mailbox memory 18. If decoder 43 or 44 determines that the address forms a part of the associated main memory 40 or 41, respectively, the decoder sends an enable pulse to its associated main memory on lead 46. The enable pulse to the associated main memory 40 or 41 causes (a) that memory to transmit the data stored at the address received from the associated MPU in sufficient time for MPU 10 or 11, respectively, to latch the data at the end of the associated Φ2 pulse during a read cycle or (b) that memory to latch the data from the associated MPU in the indicated address during a write cycle at the end of the associated Φ2 pulse.

If, however, decoder 43 or 44 should determine that the address received from the associated MPU is an address associated with mailbox memory 18, the decoder will transmit an enable signal on lead 47 to multiplexer 12 for subsequent transmission on enable lead 23 to memory 18 during the Φ2 pulse of the associated MPU when that MPU is able to communicate with memory 18.

More particularly, if MPU 10 outputs an address forming a part of main memory 40 in response to the rise of the Φ1 pulse on lead 26, address decoder 43 immediately decodes the address and transmits an enable signal to main memory 40 on lead 46. Main memory 40 receives both the outputted address concurrent with decoder 43 and the read or write signal on lead 15 and operates on the address during the memory access time as shown in FIGS. 1 and 2. During the Φ1 pulse, the decoder 43 decodes the address and transmits an enable pulse on lead 46 to memory 40. In response to the addres, the read or write pulse and the enable pulse, main memory 40 is caused to latch the data transmitted by MPU 10 on data bus 16 into the designated memory location at the end of the Φ2 pulse for a write cycle, as shown in FIG. 2, or output the data stored at the designated memory location in sufficient time for MPU 10 to latch the data at the end of the Φ2 for a read cycle, as shown in FIG. 1. If, however, MPU 10 outputs an address forming a part of mailbox memory 18, in response to the Φ1 pulse on lead 26, address decoder 43 decodes the address and then transmits an enable signal on lead 47 to multiplexer 12. Since no enable pulse is transmitted on lead 46 to main memory 40, this memory will not transmit data to or receive data from MPU 10 during the current read or write cycle. As shown in FIG. 4, during the Φ2 pulse associated with MPU 10, multiplexer 12 interconnects MPU 10 to mailbox memory 18. During this Φ2 pulse, the address from MPU 10 on bus 20 is accessed and in response to the enable signal on leads 47 and 23 from decoder 43, the memory 18 (a) latches the data on bus 22 from MPU 10 in the designated memory location during a write cycle at the end of the associated Φ2 pulse or (b) transmits the data from the designated memory location during a read cycle in sufficient time for MPU 10 to latch the data at the end of the Φ2 pulse. MPU 11 and the associated address decoder 44 and main memory 41 function in the same manner as MPU 10 and the associated elements except for the use of complementary clock cycles as explained hereinbefore in association with FIG. 4.

From the foregoing description, main memory 40 and 41 operate with MPU 10 and 11, respectively, in accordance with the timing diagrams of FIGS. 1 and 2 using complementary master clock signals whereas mailbox memory 18 operates with MPUs 10 and 11 in accordance with the timing diagram of FIG. 4. Main memories 40 and 41 can, therefore, be slower type memories than that needed for mailbox memory 18 primarily because of the difference in the memory access time which can be tolerated.

Job requirements dictate the size of the communication channel or mailbox memory 18 needed. Operation of this memory block is similar to that of a rural mailbox. A piece or many pieces of mail may be dropped in the box and the flag raised. The flag could possibly take the form of a nonzero character in some base location in mailbox memory 18 which informs the second processor as to the size and/or nature of the message to be read. For example, MPU 10 could compose a message directly within the mailbox memory 18 without need for a secondary scratchpad memory in main memory 40 and raise a flag indicating that such memory is there for MPU 11 by, for example, writing a "1" in a flag word in memory 18. MPU 11, after noticing the flag, accesses the mailbox memory 18 at the appropriate location and operates on the message in place thus eliminating another scratchpad in the main memory 41. MPU 11 now replaces the message with a reply or blanks and then lowers or clears the flag by writing a "0" in the corresponding flat bit, thereby indicating it has completed its task.

Figure 6:
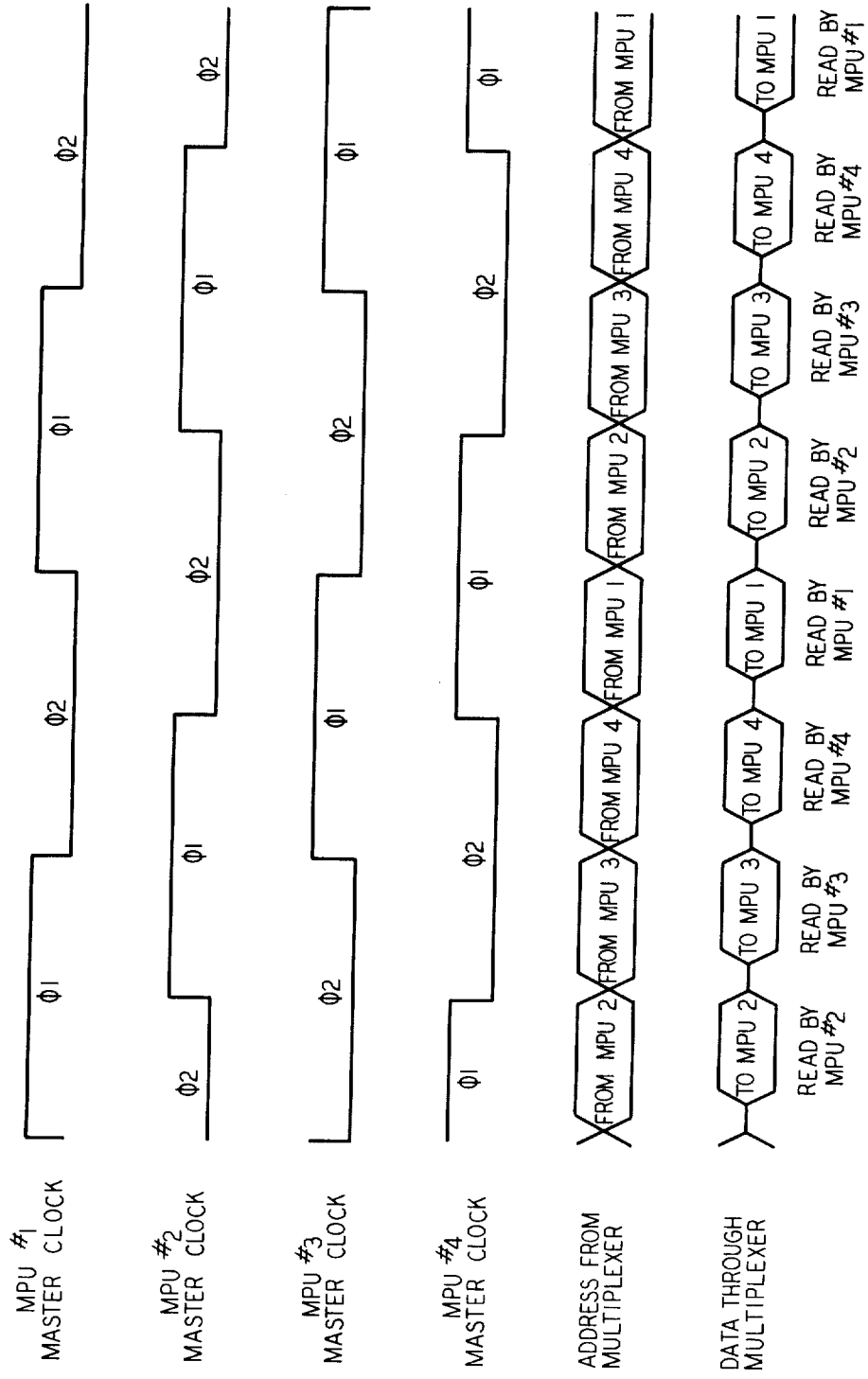
FIG. 6 illustrates an exemplary timing diagram for a read cycle in accordance with the present invention where four MPUs are used in the systems of FIGS. 3 or 5.

The technique may be extended to allow more than two processors to access a single memory at the expense of added timing and multiplexing complexity. However, the great versatility achieved may well be worth the additional investment. FIG. 6 shows a typical timing diagram for a read cycle in an arrangement similar to FIGS. 3 or 5 using four MPUs. For simplicity, the clock pulse shown in FIG. 6 for MPUs 1 to 4 relate to the master clock pulses shown in FIG. 1 and the Φ1 and Φ2 designations are merely included to show their normal occurrence for each MPU during its associated master clock cycle. The actual Φ1 and Φ2 pulse can be derived from the timing diagram of FIG. 1 for each of MPUs 1–4.

In FIG. 6, the master clock pulses for MPU 2 are shown delayed in phase from the master clock pulses for MPU 1 by 90 degrees. Similarly, the master clock pulses for MPU 3 are delayed in phase from the master clock pulses of MPU 2 by 90 degrees and the master clock pulses of MPU 4 are delayed in phase from the master clock pulses of MPU 3 by 90 degrees. It is to be understood that each of MPUs 1–4 use the timing cycle shown in FIGS. 1 and 2 and that the data must be available to the MPU or memory 18, depending on whether the operation is a read or write cycle, in sufficient time to allow the data to be latched at the end of the Φ2 pulse. As was seen in the timing diagram of FIG. 4, access to memory 18 was provided to each MPU during its respective Φ2 pulse to ensure proper latching. In the typical timing arrangement of FIG. 6, each of MPUs 1–4 is granted access to memory 18 by multiplexer 12 during the last half of its respective Φ2 pulse thereby resulting in the sequential acquisition of memory 18 by the MPUs 1–4. Therefore, in accordance with the present invention, each MPU is permitted to sequentially access memory 18 for a period equalling 1/n of its normal operational timing cycle shown in FIGS. 1 and 2 which includes the end of the Φ2 pulse, where n equals the number of MPUs in the multiple access arrangement. Such an arrangement requires the memory 18 to be sufficiently fast to both decode the address and either (a) transmit the information stored in the designated address in sufficient time for the associated MPU to latch the data at the end of the Φ2 pulse during a read cycle or (b) latch the data from the associated MPU during a write cycle at the end of the Φ2 pulse. The MPUs used must also be sufficiently fast to set up and latch the data from memory 18 during the portion of the last half of its Φ2 pulse when memory 18 is able to send the data during a read cycle.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. A multiple microprocessor interconnection arrangement comprising
   at least a first and a second microprocessor unit, each microprocessor unit being adapted to concurrently perform a different function from that being performed by the other microprocessor units;
   an interconnection channel comprising a memory unit connected to each of said at least first and second microprocessor units and a multiplexer disposed between each of said first and second microprocessor units and said memory unit, said memory unit including a plurality of memory locations accessible to each of said at least first and second microprocessor units; and
   timing means connected to each of said at least first and second microprocessor units and said multiplexer of the interconnection channel, said timing means being capable of generating timing signals which both produce a normal operational timing cycle for each microprocessor unit which is offset by a predetermined amount from the timing cycle of each of the other microprocessor units and cause the multiplexer to sequentially connect each of said at least first and second microprocessor units to said memory unit for accessing and performing a read or write function in a desired memory location in said memory unit during a predetermined corresponding portion of each microprocessor unit's timing cycle which does not overlap the corresponding portion of another microprocessor unit's offset timing cycle.

2. A multiple microprocessor interconnection arrangement according to claim 1 wherein said memory unit in the interconnection channel comprises both the program and temporary memory associated with each of the at least first and second microprocessor units and the temporary memory for storing data to be transferred between microprocessor units in response to the individual program sequences.

3. A multiple microprocessor interconnection arrangement according to claim 1 wherein each of said at least first and second microprocessor units comprises a separate memory for storing the program and temporary memory for the associated microprocessor unit; and said interconnection channel memory unit includes a plurality of memory locations capable of temporarily storing data transmitted between said at least first and second microprocessor units.

4. A multiple microprocessor interconnection arrangement according to claim 3 wherein each of said at least first and second microprocessor units comprises a separate address decoder capable of both (1) determining from an address generated by the associated microprocessor unit which one of the associated separate microprocessor unit memory and interconnection channel memory unit is to be accessed by the associated microprocessor unit and (2) generating an enable signal to the determined memory to be accessed.

5. A multiple microprocessor interconnection arrangement according to claim 4 wherein in response to the enable signal from the associated address decoder, the related microprocessor unit is permitted to access the enabled one of (1) the associated separate memory during the normal phase of its operational timing cycle and (2) the common memory unit during the 1/n phase of its normal operational timing cycle which ends with the latching by either one of the microprocessor unit and the common memory unit of data being transmitted therebetween where n equals the number of microprocessor units capable of sequentially sharing the common memory unit.

6. A multiple microprocessor interconnection arrangement according to claim 1 wherein the operational timing cycle generated by said timing means for said at least second microprocessor unit is delayed in phase from the operational timing cycle generated by said timing means for said at least first microprocessor unit by an amount which equals 1/n of the normal operational timing cycle for such microprocessor unit, where n is the total number of microprocessor units sequentially sharing said interconnection channel.

7. A multiple microprocessor interconnection arrangement according to claim 6 wherein the timing signals from said timing means to said interconnection channel function to permit each of said at least first and second microprocessor units to access the memory unit only during the 1/n portion of its associated operational timing cycle which ends in the latching by either one of the microprocessor unit and the memory unit of data which is transmitted therebetween.

8. A method of permitting each of a plurality of n microprocessor units to access a memory unit common to all of the plurality of n microprocessor units without the necessity for contention resolving means, the method comprising the steps of:

(a) concurrently generating separate timing signals which form the normal operational timing cycle for each microprocessor unit of the plurality of n microprocessor units, the operational timing cycle for each microprocessor unit being at a different 1/n phase of the normal operational timing cycle at any instant of time; and (b) in response to the timing signals generated in step (a), permitting each of the plurality of n microprocessor units to access the common memory unit only during the 1/n phase of its normal operational timing cycle which ends with the latching by either one of the microprocessor unit and the common memory unit of data being transmitted therebetween.

9. A method of permitting each of a plurality of n microprocessor units to access a memory unit common to all microprocessor units without the necessity for contention resolving means where each microprocessor unit comprises a separate associated memory wherein is stored its operational program, the method comprising the steps of:

(a) concurrently generating timing signals which form the normal operational timing cycle for each microprocessor unit of the plurality of n microprocessor units, the operational timing cycle for each microprocessor unit of the pluality of n microprocessor units being at a different 1/n phase of the normal operational timing cycle at any instant of time;

(b) decoding the memory address generated by each microprocessor unit of the plurality of n microprocessor units for determining which memory of either one of the separate associated memory and the common memory unit is desired to be accessed by each of the microprocessor units;

(c) in response to step (b) transmitting an enable signal to the memory to be accessed by each of the microprocessor units; and (d) in response to the timing signals of step (a) and the enable signals of step (c), permitting each of the plurality of n microprocessor units to access either one of (1) its separate associated memory during the normal period of its operational timing cycle designated for such access, and (2) the common memory unit only during the 1/n phase of its normal operational timing cycle which ends with the latching by either one of the microprocessor unit and the common memory unit of data being transmitted therebetween.

* * * * *